(12) United States Patent
Yoshikawa et al.

(10) Patent No.: US 11,975,778 B2
(45) Date of Patent: May 7, 2024

(54) INFORMATION PROCESSING APPARATUS, NON-TRANSITORY STORAGE MEDIUM, AND INFORMATION PROCESSING METHOD

(71) Applicant: TOYOTA JIDOSHA KABUSHIKI KAISHA, Toyota (JP)

(72) Inventors: Katsuhisa Yoshikawa, Toyota (JP); Yuji Suzuki, Kariya (JP); Keita Yamazaki, Nisshin (JP); Kei Matsumoto, Toyota (JP); Hiroyuki Ito, Nagoya (JP); Takashi Ogawa, Toyota (JP); Yukiya Sugiyama, Toyota (JP); Masaru Ando, Seto (JP); Yasushi Fujiwara, Toyota (JP); Azusa Nakagame, Kariya (JP); Erina Toyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 607 days.

(21) Appl. No.: 17/166,092

(22) Filed: Feb. 3, 2021

(65) Prior Publication Data
US 2021/0237815 A1 Aug. 5, 2021

(30) Foreign Application Priority Data
Feb. 4, 2020 (JP) .................. 2020-016934

(51) Int. Cl.
| | | |
|---|---|---|
| B62D 65/04 | (2006.01) | |
| B62D 21/12 | (2006.01) | |
| B62D 27/06 | (2006.01) | |
| B62D 65/02 | (2006.01) | |
| G05D 1/00 | (2006.01) | |
| G06Q 30/0207 | (2023.01) | |

(52) U.S. Cl.
CPC ............. *B62D 65/04* (2013.01); *B62D 21/12* (2013.01); *B62D 27/06* (2013.01); *B62D 65/022* (2013.01);
(Continued)

(58) Field of Classification Search
CPC ........ B62D 65/04; B62D 21/12; B62D 27/06; B62D 65/022; B62D 63/02; B62D 24/00;
(Continued)

(56) References Cited

U.S. PATENT DOCUMENTS

| | | | | |
|---|---|---|---|---|
| 6,857,889 B1 * | 2/2005 | Vitale | ................... | B62D 24/00 439/269.1 |
| 7,036,870 B2 * | 5/2006 | Nieminski | ............. | B62D 65/04 296/193.04 |

(Continued)

FOREIGN PATENT DOCUMENTS

| | | | |
|---|---|---|---|
| CN | 108749929 A | * | 11/2018 |
| CN | 109725616 A | | 5/2019 |

(Continued)

*Primary Examiner* — Pinel E Romain
(74) *Attorney, Agent, or Firm* — Sughrue Mion, PLLC

(57) ABSTRACT

An information processing apparatus disclosed has a controller configured to execute the processing of accepting a request for retrieving a target vehicle body unit that is laid at a specific place, selecting a chassis unit for retrieval from among chassis units in the state separated from any vehicle body unit, the chassis unit for retrieval being a chassis unit to be used to retrieve the target vehicle body unit, and sending a retrieval command to the chassis unit for retrieval, the retrieval command being a command to retrieve the target vehicle body unit.

20 Claims, 9 Drawing Sheets

(52) U.S. Cl.
CPC ....... *G05D 1/0225* (2013.01); *G06Q 30/0207* (2013.01)

(58) Field of Classification Search
CPC .. B62D 33/042; G05D 1/0225; G05D 1/0088; G06Q 30/0207; G06Q 10/30; G06Q 10/0832; G06Q 10/0836; G06Q 10/083; Y02W 90/00; B65D 90/0066; B65D 90/0073; B65D 90/0086; B60P 1/6427; B60P 3/007; B60P 3/423; G07F 17/12
USPC .................................................. 296/193.04
See application file for complete search history.

(56) References Cited

U.S. PATENT DOCUMENTS

| | | | |
|---|---|---|---|
| 7,475,747 B2 * | 1/2009 | Plishner | B60K 6/46 903/905 |
| 10,592,851 B1 * | 3/2020 | Patel | B62D 33/042 |
| 11,586,222 B2 * | 2/2023 | Georgeson | G05D 1/0293 |
| 11,702,162 B2 * | 7/2023 | Harmon | B60K 1/00 296/193.04 |
| 11,794,816 B2 * | 10/2023 | Iwasaki | G01C 21/34 |
| 2003/0094319 A1 * | 5/2003 | Chernoff | B60K 1/04 180/54.1 |
| 2016/0019497 A1 * | 1/2016 | Carvajal | G01C 21/34 705/333 |
| 2019/0196479 A1 | 6/2019 | Kaneko et al. | |
| 2021/0284201 A1 * | 9/2021 | Harada | G05D 1/0022 |
| 2022/0274658 A1 * | 9/2022 | Kägi | B60P 3/423 |

FOREIGN PATENT DOCUMENTS

| | | |
|---|---|---|
| DE | 102009057693 A1 | 5/2011 |
| JP | 2019-117595 A | 7/2019 |
| WO | 2019/238673 A1 | 12/2019 |

\* cited by examiner

[Fig. 1]
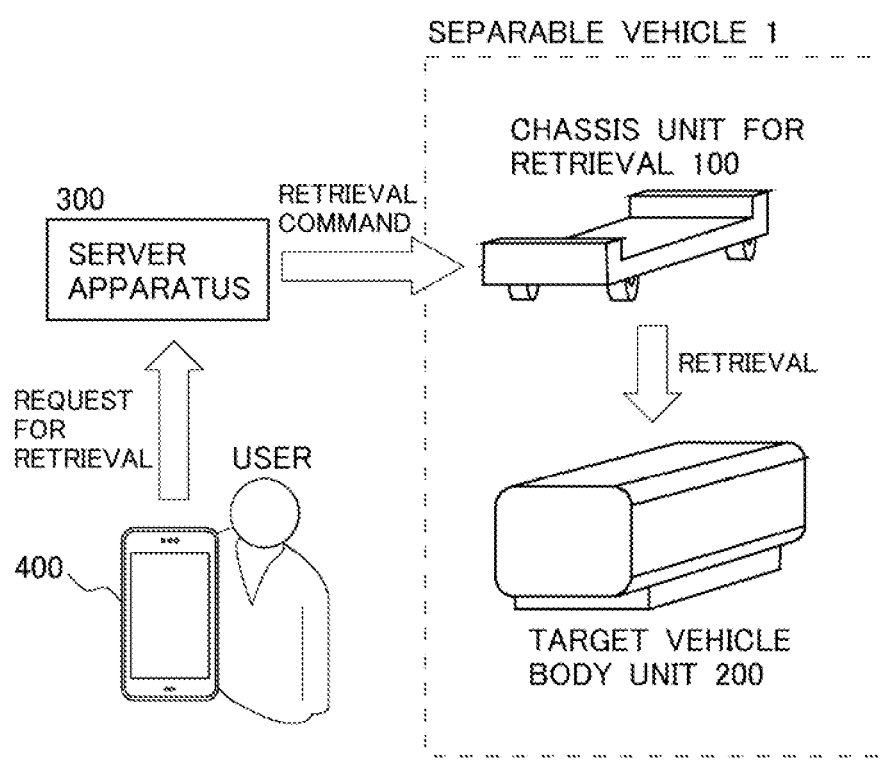

[Fig. 2]
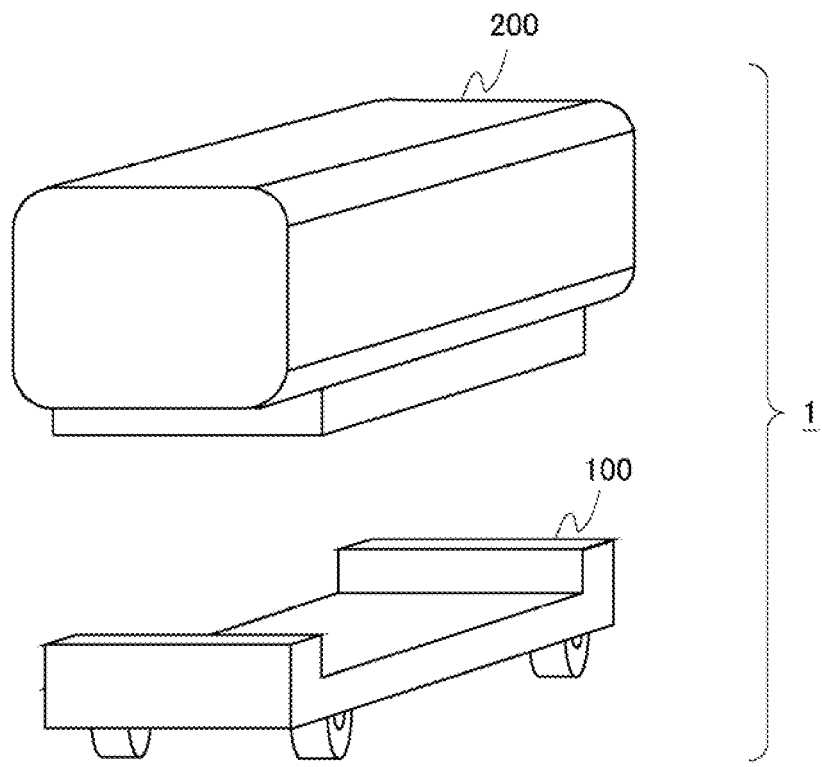
[Fig. 3]
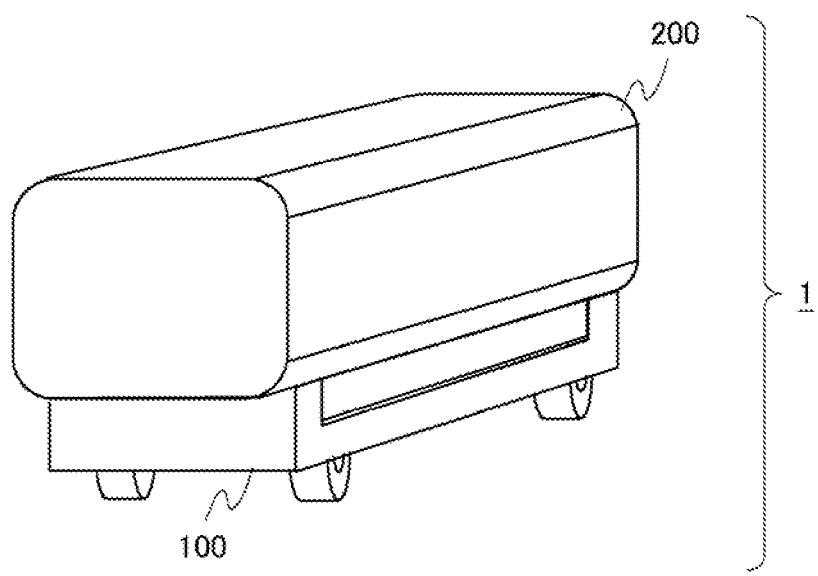

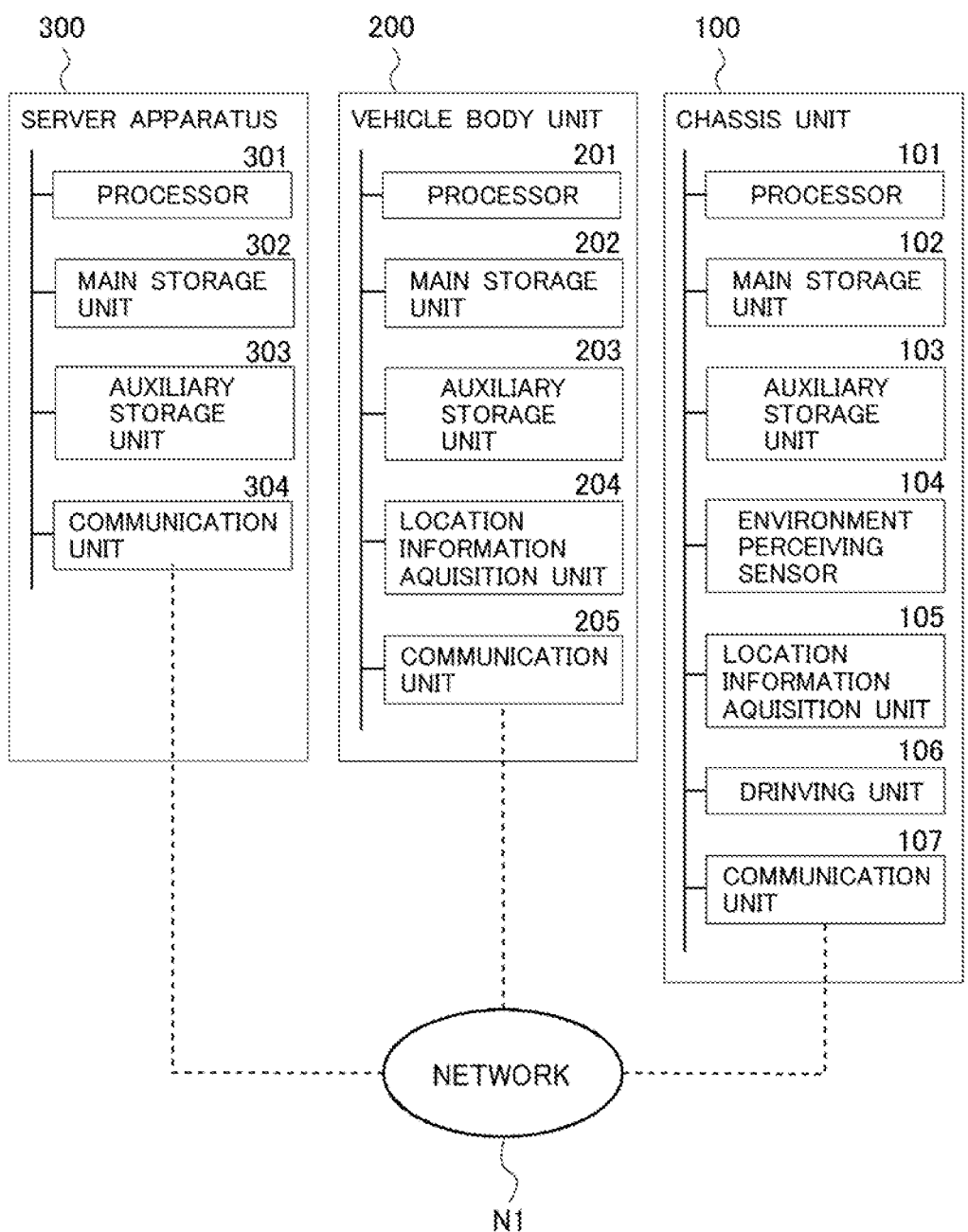
[Fig. 4]

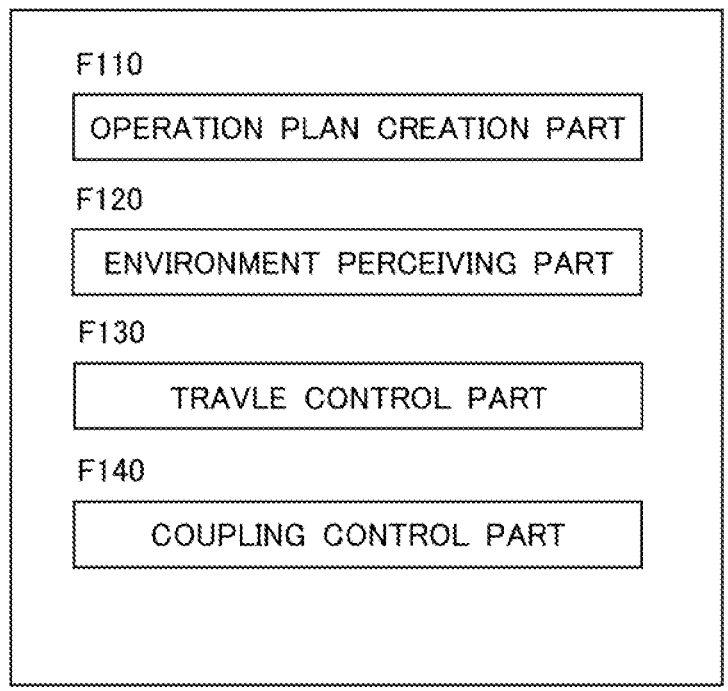
[Fig. 5]

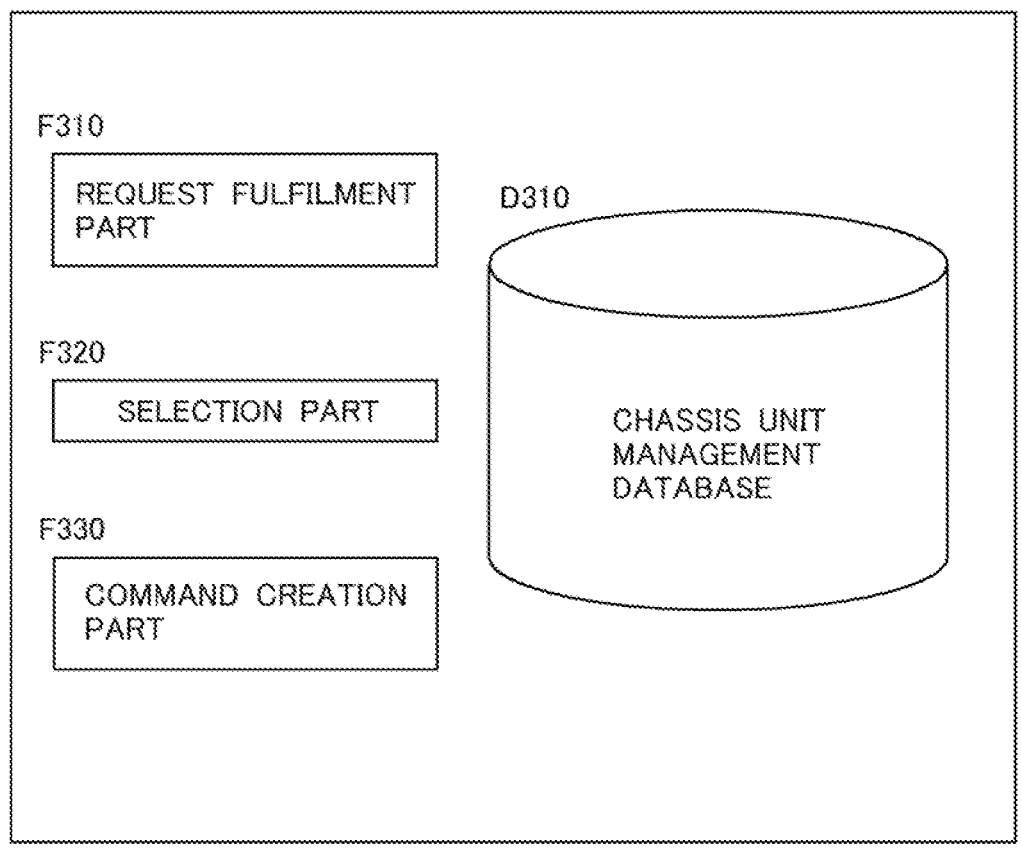
[Fig. 6]

[Fig. 7]

| CHASSIS ID | PRESENT LOCATION | STATUS |
|---|---|---|
| C001 | ---- | COUPLED |
| C002 | ---- | RETRIEVING |
| C003 | ---- | RETRIEVING |
| C004 | ---- | FREE |
| ⋮ | ⋮ | ⋮ |

[Fig. 8]
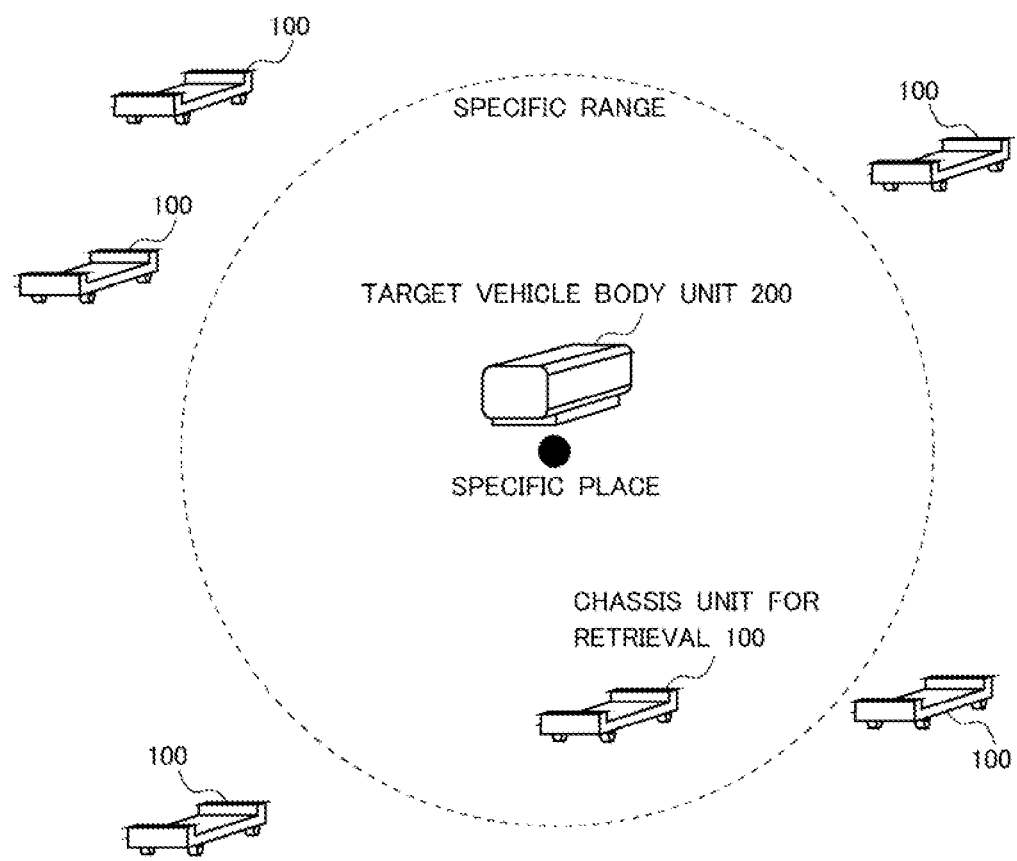

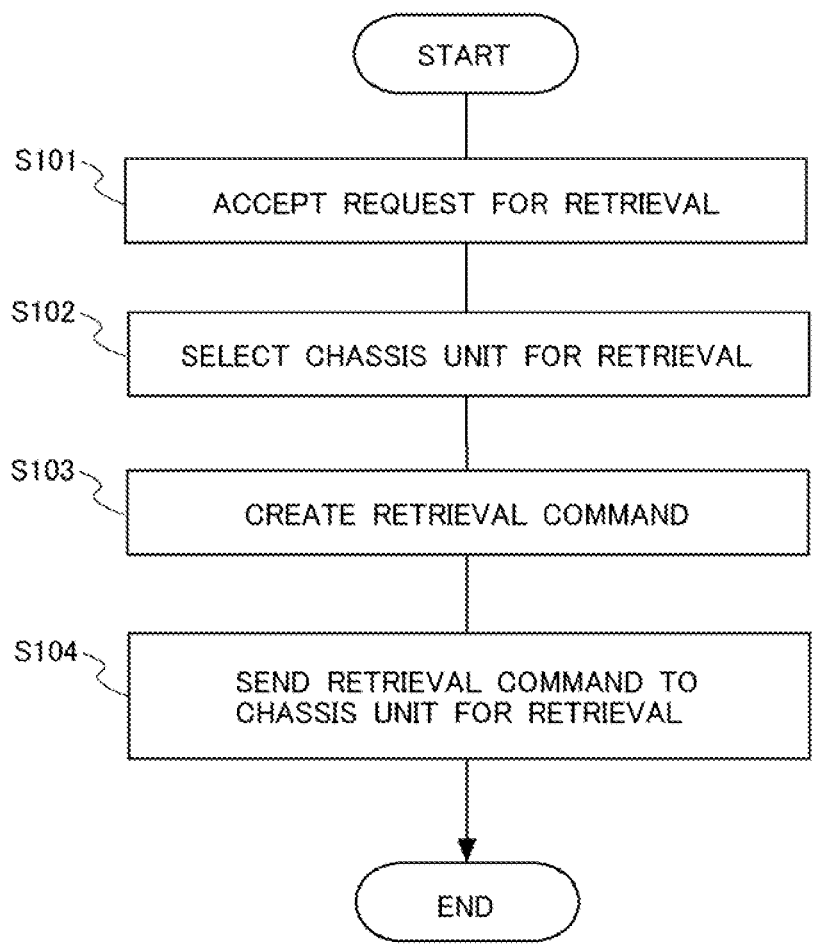
[Fig. 9]

[Fig. 10]
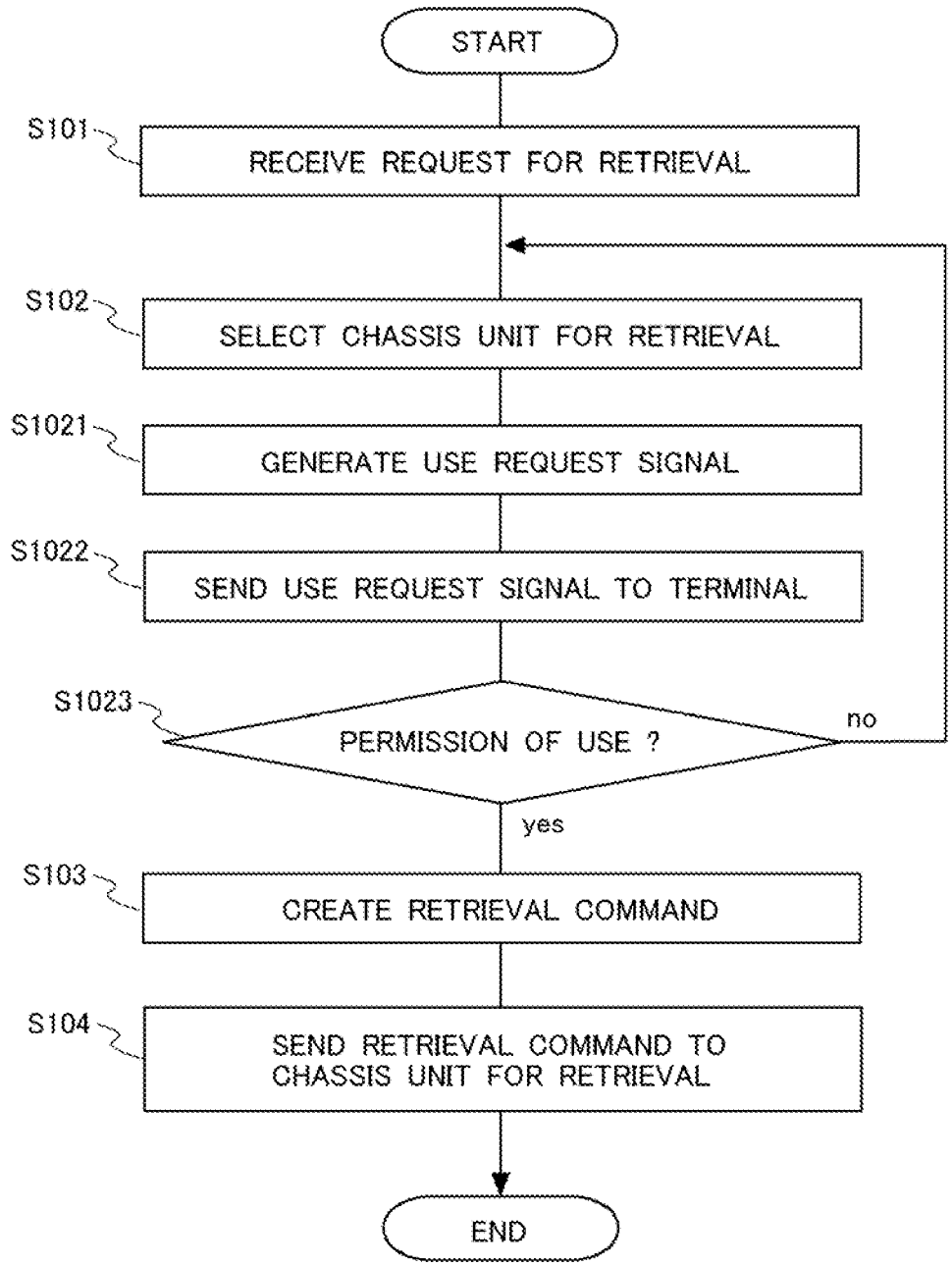

INFORMATION PROCESSING APPARATUS, NON-TRANSITORY STORAGE MEDIUM, AND INFORMATION PROCESSING METHOD

CROSS REFERENCE TO RELATED APPLICATION

This application claims the benefit of Japanese Patent Application No. 2020-016934, filed on Feb. 4, 2020, which is hereby incorporated by reference herein in its entirety.

BACKGROUND

Technical Field

This disclosure relates to technologies pertaining to management of separable vehicles.

Description of the Related Art

There are known separable vehicles constructed by combining a plurality of separable units (see, for example, Patent Document 1 in the citation list below).

CITATION LIST

Patent Literature

Patent Literature 1: DE 10 2009 057 693

SUMMARY

An object of this disclosure is to provide a technology that enables efficient retrieval of a vehicle body unit laid at a specific place.

Disclosed herein is an information processing apparatus for managing a separable vehicle including a vehicle body unit and a chassis unit adapted to be coupled to and decoupled from the vehicle body unit and capable of travelling autonomously. The information processing apparatus may comprise a controller equipped with at least one processor. The controller may be configured to execute the processing of:

accepting a request for retrieving a target vehicle body unit that is laid at a specific place;

selecting a chassis unit for retrieval from among chassis units in the state separated from any vehicle body unit, the chassis unit for retrieval being a chassis unit to be used to retrieve the target vehicle body unit; and sending a retrieval command to the chassis unit for retrieval, the retrieval command being a command to retrieve the target vehicle body unit.

Also disclosed herein is an information processing program for managing a separable vehicle including a vehicle body unit and a chassis unit adapted to be coupled to and decoupled from the vehicle body unit and capable of travelling autonomously, or a non-transitory storage medium storing the information processing program. The information processing program may be configured to cause a computer to execute the following steps of processing:

accepting a request for retrieving a target vehicle body unit that is laid at a specific place;

selecting a chassis unit for retrieval from among chassis units in the state separated from any vehicle body unit, the chassis unit for retrieval being a chassis unit to be used to retrieve the target vehicle body unit; and sending a retrieval command to the chassis unit for retrieval, the retrieval command being a command to retrieve the target vehicle body unit.

Also disclosed herein is an information processing method for managing a separable vehicle including a vehicle body unit and a chassis unit adapted to be coupled to and decoupled from the vehicle body unit and capable of travelling autonomously. The information processing method may comprise the following steps of processing executed by a computer:

accepting a request for retrieving a target vehicle body unit that is laid at a specific place;

selecting a chassis unit for retrieval from among chassis units in the state separated from any vehicle body unit, the chassis unit for retrieval being a chassis unit to be used to retrieve the target vehicle body unit; and sending a retrieval command to the chassis unit for retrieval, the retrieval command being a command to retrieve the target vehicle body unit.

This disclosure can provide a technology that enables efficient retrieval of a vehicle body unit laid at a specific place.

BRIEF DESCRIPTION OF THE DRAWINGS

FIG. 1 is a diagram illustrating the general configuration of a vehicle management system.

FIG. 2 is a first diagram illustrating the general configuration of a separable vehicle.

FIG. 3 is a second diagram illustrating the general configuration of the separable vehicle.

FIG. 4 is a diagram illustrating the hardware configurations of a chassis unit, a vehicle body unit, and a server apparatus.

FIG. 5 is a block diagram illustrating an exemplary functional configuration of the chassis unit.

FIG. 6 is a block diagram illustrating an exemplary functional configuration of the server apparatus.

FIG. 7 illustrates an exemplary structure of a chassis unit information table.

FIG. 8 illustrates a method of selecting a chassis unit to be employed for the purpose of retrieval.

FIG. 9 is a flow chart of a process executed by the server apparatus according to an embodiment.

FIG. 10 is a flow chart of a process executed by the server apparatus according to a modification.

DESCRIPTION OF THE EMBODIMENTS

The technology disclosed herein is characterized by that a certain chassis unit is employed to retrieve a vehicle body unit laid at a certain place. The chassis unit mentioned in this disclosure refers to a unit configured to be coupled to and decoupled from a vehicle body unit and capable of travelling autonomously by autonomous driving.

In the case where a vending machine or a shop is mounted on a vehicle body unit, there may be cases where the vehicle body unit separated from a chassis unit is laid alone at a specific place. The specific place may be, for example, a predetermined place for operation or a place for temporary operation, such as an event venue. It is necessary for the vehicle body unit laid at such a specific place to be retrieved from that place when the need for replenishment of goods for sale arises or after the event ends. If the user of the vehicle body unit retrieves the vehicle body unit for himself/herself, it may take time and effort for the user to do so.

As a countermeasure to the above problem, the technology disclosed herein employs a certain chassis unit in the state separated from any vehicle body unit (which will also be referred to as "free state" hereinafter) to let it retrieve a vehicle body unit laid at a certain place, when a request for retrieving the vehicle body unit is made.

Specifically, a controller of an information processing apparatus according this disclosure receives a request for retrieval of a vehicle body unit laid at a specific place (which will be referred to as the "target vehicle body unit"). The request for retrieval is sent from, for example, a terminal used by the user of the vehicle body unit to the information processing apparatus. Then, the controller selects a chassis unit to be employed to retrieve the vehicle body unit (which will be referred to as the "chassis unit for retrieval") from among the chassis units that are under the management of the information processing apparatus and in the free state. Then, the controller sends a retrieval command to the chassis unit for retrieval selected as above. The retrieval command is a command to retrieve the target vehicle body unit from the specific place. The chassis unit for retrieval that has received this retrieval command operates pursuant to the retrieval command to retrieve the target vehicle body unit from the specific place. This saves the user of the target vehicle body unit the time and effort of retrieving the target vehicle body unit. Thus, the vehicle body unit can be retrieved efficiently.

When the chassis unit for retrieval is selected, the controller may send a use request to a terminal used by the user of the chassis unit for retrieval to request permission of the use of the chassis unit for retrieval. If a signal responding to the use request indicates permission of the use of the chassis unit for retrieval, the controller may send a retrieval command to the chassis unit for retrieval. In the case where the chassis unit for retrieval is one owned by a user, the above process can prevent the chassis unit for retrieval from being used against the user's will.

The use request may contain information about an incentive that will be given to the user of the chassis unit for retrieval if he or she permits the use of the chassis unit for retrieval. Such an incentive may include a fee for the cost incurred by the use of the chassis unit for retrieval in the operation of retrieving the target vehicle body unit (e.g. electricity cost, fuel cost, and/or toll) and a reward. This can motivate the user of the chassis unit for retrieval to permit the use of the chassis unit for retrieval. If a signal responding to the use request indicates disapproval of the use of the chassis unit for retrieval, the controller may select a chassis unit other than the aforementioned chassis unit for retrieval from among the chassis units in the free state, as a new chassis unit for retrieval. Then, the controller may send a use request similar to the aforementioned use request to a terminal used by the user of the newly selected chassis unit for retrieval.

The aforementioned request for retrieval may include information about the location of the aforementioned specific place, information specifying a place to which the target vehicle body unit is to be transported (i.e. destination of transportation), and information about a desired time of retrieval (i.e. a time at which the vehicle body unit is to be retrieved from the specific place). From such information, the information processing apparatus can know the location of the target vehicle body unit (i.e. the location of the specific place), the place to which the retrieved target vehicle body unit is to be transported, and the desired time at which the target vehicle body unit is to be retrieved (namely, the time by which the chassis unit should arrive at the specific place). The controller of the information processing apparatus can control the chassis unit for retrieval on the basis of the request for retrieval. For example, the controller may send to the chassis unit for retrieval a retrieval command including the following three commands:

first command: a command to cause the chassis unit for retrieval to travel in such a way as to arrive at the specific place by the desired time of retrieval second command: a command to couple the chassis unit for retrieval to the target vehicle body unit at the specific place third command: a command to cause the chassis unit for retrieval to travel from the specific place to the destination of transportation.

When receiving the command for retrieval including the first to third commands as above, the chassis unit for retrieval firstly travels autonomously by autonomous driving pursuant to the first command to the specific place by the desired time of retrieval. After arriving at the specific place, the chassis unit for retrieval operates pursuant to the second command to couple itself to the target vehicle body unit laid at the specific place. The operation of coupling the chassis unit for retrieval to the target vehicle body unit may be carried out by an external apparatus provided with a heavy machine, such as a lift or a crane. Alternatively, the operation of coupling the chassis unit for retrieval to the target vehicle body unit may be carried out by an apparatus provided on the chassis unit for retrieval or the target vehicle body unit. After the chassis unit for retrieval and the target vehicle body unit are coupled together in this way, the chassis unit for retrieval travels autonomously by autonomous driving pursuant to the third command from the specific place to the destination of transportation, thereby transporting the target vehicle body unit from the specific place to the destination of transportation. Thus, the target vehicle body unit can be retrieved without human intervention. Even in the case where the time for the target vehicle body unit to be retrieved is designated, such as in the case where the target vehicle body unit is laid in an event venue, it is possible to retrieve the target vehicle body unit at the designated time.

In selecting a chassis unit for retrieval, the controller may select a chassis unit located within a specific range from the location of the target vehicle body unit (i.e. the specific place) among the chassis unit in the free state. This specific range may be, for example, such a range that the chassis units located in it are expected to be able to go to the specific place by the desired time of retrieval designated by the request for retrieval. Selecting the chassis unit for retrieval in this way can improve the reliability of the retrieval of the target vehicle body unit by the desired time of retrieval. In cases where there are a plurality of chassis units in the free state within the specific range, the chassis unit located closest to the specific place among them may be selected as the chassis unit for retrieval.

In the following, a specific embodiment of the present disclosure will be described with reference to the drawings. It should be understood that dimensions, materials, shapes, relative arrangements, and other features of the component that will be described in connection with the embodiment are not intended to limit the technical scope of the disclosure only to them, unless otherwise stated.

Embodiment

What will be described in the following as an embodiment is a case where the information processing apparatus according to this disclosure is applied to a system for managing separable vehicles. This system will also be referred to as the "vehicle management system" hereinafter.

(General Configuration of Vehicle Management System)

FIG. 1 is a diagram illustrating the general configuration of the vehicle management system. As illustrated in FIG. 1, the vehicle management system of this embodiment includes a separable vehicle 1 and a server apparatus 300. As illustrated in FIGS. 2 and 3, the separable vehicle 1 includes a chassis unit 100 and a vehicle body unit 200. The chassis unit 100 in the system of this embodiment is a unit capable of travelling on the road autonomously by autonomous driving. The vehicle body unit 200 in the system of this embodiment is a unit on which a vending machine, a shop, or other equipment is mounted. As illustrated in FIGS. 2 and 3, the chassis unit 100 and the vehicle body unit 200 of the separable vehicle 1 can be coupled to and decoupled from each other. FIG. 2 illustrates the chassis unit 100 and the vehicle body unit 200 in the decoupled (or separated) state. FIG. 3 illustrates the chassis unit 100 and the vehicle body unit 200 in the coupled state.

In the system of this embodiment, the vehicle body unit 200 is set at a specific place, and the operation of selling goods or the like is performed there by or with the vending machine or the shop mounted on the vehicle body unit 200. The vehicle body unit 200 is laid at the specific place in the state separated from the chassis unit 100. The reason why to lay the vehicle body unit 200 in the state separated from the chassis unit 100 is to allow efficient use of the chassis unit 100 and to reduce the cost of equipment. The specific place may be a predetermined fixed place of operation or a temporary place of operation, such as an event venue.

As goods are sold by the vending machine or in the shop, the need for retrieval of the vehicle body unit 200 arises in order to replenish the goods, perform maintenance of the vending machine, or replace the goods to be sold in the shop. In the case where the vehicle body unit is laid in an event venue, it is necessary to retrieve the vehicle body unit 200 after the event ends. When the need for retrieving the vehicle body unit 200 from the specific place arises, the retrieval conducted by the user of the vehicle body unit 200 himself/herself can be inefficient, as described above.

To address the above problem, the system of this embodiment uses a chassis unit (or chassis unit for retrieval 100) in the free state located near the specific place to perform the operation of retrieving a vehicle body unit (or target vehicle body unit 200) laid at a specific place. In the system of this embodiment, the operation of retrieving the target vehicle body unit 200 is triggered by a request for retrieval sent from a user's terminal 400 to the server apparatus 300. The user's terminal 400 is, for example, a terminal used by the user of the target vehicle body unit 200. The user's terminal 400 is a small computer that can be carried by the user. Examples of the user's terminal 400 include a smartphone, a cellular phone, a tablet terminal, a personal information terminal, and a wearable computer (e.g. a smartwatch) carried by the user. The user's terminal 400 may be a personal computer that is connected to the server apparatus 300 through a network, which may be the Internet or other public communication networks. When receiving the request for retrieval, the server apparatus 300 selects a chassis unit for retrieval 100 from among the chassis units 100 that are under the management of the server apparatus 300 and in the free state. Specifically, the server apparatus 300 selects a chassis unit 100 located near the specific place from among the chassis units 100 that are under the management of the server apparatus 300 and in the free state as the chassis unit for retrieval 100. Then, the server apparatus 300 sends a command to retrieve the target vehicle body unit 200 from the specific place (retrieval command) to the chassis unit for retrieval 100. The chassis unit for retrieval 100 operates pursuant to the retrieval command to retrieve the target vehicle body unit 200 from the specific place.

(Hardware Configuration of Vehicle Management System)

The components of the vehicle management system will now be described specifically. FIG. 4 is a diagram illustrating the hardware configurations of the chassis unit 100, the vehicle body unit 200, and the server apparatus 300 shown in FIG. 1. While FIG. 4 illustrates only one chassis unit 100 and only one vehicle body unit 200, the number of chassis units 100 and the number of vehicle body units 200 under the management of the server apparatus 300 may be two or more.

The chassis unit 100 is capable of travelling on the road autonomously pursuant to an operation command. The chassis unit 100 has a processor 101, a main storage unit 102, an auxiliary storage unit 103, an environment perceiving sensor 104, a location information acquisition unit 105, a driving unit 106, and a communication unit 107. The chassis unit 100 used in the system according to the embodiment is an electric car that is driven by an electric motor. The motor of the chassis unit 100 is not limited to an electric motor, but it may be an internal combustion engine or a hybrid system of an internal combustion engine and an electric motor.

The processor 101 may be, for example, a CPU (Central Processing Unit) or a DSP (Digital Signal Processor). The processor 101 controls the chassis unit 100 and executes computation of various information processing. The main storage unit 102 may include a RAM (Random Access Memory), a ROM (Read Only Memory) and/or the like. The auxiliary storage unit 103 may include, for example, an EPROM (Erasable Programmable ROM) or a hard disk drive (HDD). The auxiliary storage unit 103 may include a removable medium, in other words, a portable recording medium. Examples of the removable medium include a USB (Universal Serial Bus) memory and disc recording media, such as a CD (Compact Disc) and a DVD (Digital Versatile Disc).

What is stored in the auxiliary storage unit 103 includes various programs, various data, and various tables, which can be written into and read out from the auxiliary storage unit 103. The auxiliary storage unit 103 stores an operating system (OS), various programs, and various tables. All or a portion of the aforementioned information and data stored in the auxiliary storage unit 103 may be stored in the main storage unit 102 instead. Likewise, all or a portion of information and data stored in the main storage unit 102 may be stored in the auxiliary storage unit 103 instead.

The environment perceiving sensor 104 includes one or more sensors for sensing the environment of the vehicle, which typically includes a stereo camera, a laser scanner, a LIDAR, a radar, or the like. Information acquired by the environment perceiving sensor 104 is passed to the processor 101.

The location information acquisition unit 105 is a device for acquiring information about the present location of the chassis unit 100. The location information acquisition unit 105 typically includes a GPS receiver. The location information acquisition unit 105 acquires information about the present location of the chassis unit 100 repeatedly at predetermined intervals. The location information acquired by the location information acquisition unit 105 is sent to the server apparatus 300 through the communication unit 107, which will be described later. Thus, location information of the chassis unit 100 is sent from the chassis unit 100 to the server apparatus 300 repeatedly at predetermined intervals. In consequence, the server apparatus 300 can recognize the present location of each chassis unit 100.

The driving unit 106 is a device that drives the chassis unit 100. The driving unit 106 includes, for example, an electronic motor serving as the motor of the chassis unit 100, a battery that supplies electrical power to the electric motor, a braking device for braking the chassis unit 100, and a steering device for changing the steering angle of the wheels of the chassis unit 100.

The communication unit 107 is a device that connects the chassis unit 100 to a network N1. The communication unit 107 connects itself with the network N1 using mobile communications, such as 5G (5th Generation) mobile communications or LTE (Long Term Evolution) mobile communications. Alternatively, the communication unit 107 may connect itself with the network N1 using narrow-band communications, such as DSRC (Dedicated Short Range Communications), or WiFi (registered trademark). Thus, the communication unit 107 can communicate with other devices such as the vehicle body unit 200 and the server apparatus 300 via the network N1. For example, the communication unit 107 sends the present location information acquired by the location information acquisition unit 105 and other information to the server apparatus 300 via the network N1. The network N1 may be, for example, a WAN (Wide Area Network), which may be a global public communication network such as the Internet, or other communication network.

The hardware configuration of the chassis unit 100 is not limited to that illustrated in FIG. 4, but some components may be eliminated, replaced, or added. For example, the chassis unit 100 may be provided with an apparatus used to perform the operation of coupling it with and/or decoupling it from the vehicle body unit 200. Examples of such an apparatus include a heavy machine equipped with a lift or a crane and an electromagnet device. Various processing executed by the chassis unit 100 may be executed by either hardware or software.

As described above, the vehicle body unit 200 is a unit on which a vending machine, a shop or the like is mounted. The vehicle body unit 200 is adapted to be laid at a certain place so that goods can be sold. The vehicle body unit 200 has a processor 201, a main storage unit 202, an auxiliary storage unit 203, a location information acquisition unit 204, and a communication unit 205. The processor 201, the main storage unit 202, the auxiliary storage unit 203, the location information acquisition unit 204, and the communication unit 206 are similar to their corresponding components of the chassis unit 100 and therefore will not be described further.

The hardware configuration of the vehicle body unit 200 is not limited to that illustrated in FIG. 4, but some components may be eliminated, replaced, or added. Various processing executed by the vehicle body unit 200 may be executed by either hardware or software.

The server apparatus 300 is an apparatus that manages the separable vehicle 1 (including the chassis unit 100 and the vehicle body unit 200). The server apparatus 300 constitutes the information processing apparatus according to the disclosure. The server apparatus 300 has a configuration as an ordinary computer. The server apparatus 300 has a processor 301, a main storage unit 302, an auxiliary storage unit 303, and a communication unit 304. The processor 301, the main storage unit 302, the auxiliary storage unit 303, and the communication unit 304 are interconnected by busses. The processor 301, the main storage unit 302, and the auxiliary storage unit 303 are similar to their corresponding components of the chassis unit 100 and therefore will not be described further. The communication unit 304 performs communication of information between the server apparatus 300 and external devices. The communication unit 304 may include, for example, a LAN (Local Area Network) interface board or a wireless communication circuit for wireless communication. The LAN interface board or the wireless communication circuit is connected to the network N1.

The hardware configuration of the server apparatus 300 is not limited to that illustrated in FIG. 4, but some components may be eliminated, replaced, or added. Various processing executed by the server apparatus 300 may be executed by either hardware or software.

(Functional Configuration of Chassis Unit)

The functional configuration of the chassis unit 100 will now be described with reference to FIG. 5. As illustrated in FIG. 5, the chassis unit 100 according to this embodiment includes, as functional components, an operation plan creation part F110, an environment perceiving part F120, a travel control part F130, and a coupling control part F140. The chassis unit 100 implements these functional components by executing programs stored in the main storage unit 102 or the auxiliary storage unit 103 by the processor 101. One or some of the operation plan creation part F110, the environment perceiving part F120, the travel control part F130, and the coupling control part F140 may be implemented entirely or partly by a hardware circuit(s). One or some of the above functional components or a part of the processing of them may be implemented by another computer(s) connected to the network N1. For example, the processing executed as the operation plan creation part F110, the processing executed as the environment perceiving part F120, the processing executed as the travel control part F130, and the processing executed as the coupling control part F140 may be executed by different computers.

The operation plan creation part F110 is configured to create an operation plan of the chassis unit 100 on the basis of an operation command sent from the server apparatus 300. The operation plan is data specifying a route along which the chassis unit 100 is to travel and an operation(s) that the chassis unit 100 is to perform in a part or the entirety of the route. Examples of data included in the operation plan are as follows.

(1) Data that Specifies a Route Along which the Chassis Unit 100 is Planned to Travel (Planned Travel Route) by a Set of Road Links The planned travel route mentioned above may be created, for example, by the operation plan creation part F110 based on the command sent from the server apparatus 300 using map data stored in the auxiliary storage unit 103 or other storage means. Alternatively, the planned travel route may be created using an external service or supplied by the server apparatus 300.

(2) Data that Specifies an Operation(s) to be Performed by the Chassis Unit 100 at a Certain Location(s) in the Planned Travel Route An example of the aforementioned certain location is a location at which the chassis unit 100 and the vehicle body unit 200 are decoupled from or coupled to each other. An example of the operation to be performed by the chassis unit 100 at that location includes, but is not limited to, decoupling/coupling the chassis unit 100 from/to the vehicle body unit 200.

The environment perceiving part F120 is configured to perceive the environment around the chassis unit 100 using data acquired by the environment perceiving sensor 104. Examples of what is perceived by the environment perceiving part F120 include, but are not limited to, the number and the position of lanes, the number and the position of vehicles present around the chassis unit 100, the number and the position of obstacles present around the chassis unit 100, the structure of the road, and road signs. What is perceived by the environment perceiving part F120 may include anything that is useful for autonomous traveling of the chassis unit 100. The environment perceiving part F120 may be configured to perform tracking of a perceived object. For example, the environment perceiving part F120 may be configured to calculate the relative speed of the perceived object from the difference between the coordinates of the object determined in a previous step and the present coordinates of it.

The travel control part F130 is configured to control the travel of the chassis unit 100 on the basis of the operation plan created by the operation plan creation part F110, environment data created by the environment perceiving part F120, and the location information of the chassis unit 100 acquired by the location information acquisition unit 105. For example, the travel control part F130 causes the chassis unit 100 to travel along the planned travel route created by the operation plan creation part F110. In doing so, the travel control part F130 causes the chassis unit 100 to travel so that obstacles will not enter a predetermined safety zone around the chassis unit 100. A known method may be employed to cause the chassis unit 100 to travel autonomously. Moreover, the travel control part F130 has the function of controlling the travel of the chassis unit 100 pursuant to the command sent from the server apparatus 300.

The coupling control part F140 is configured to control coupling and decoupling of the chassis unit 100 and the vehicle body unit 200 to and from each other. In the case where the operations of coupling and decoupling the chassis unit 100 and the vehicle body unit 200 are carried out by an external apparatus, the coupling control part F140 controls this external apparatus by wireless communication or the like to carry out the operations of coupling and decoupling the chassis unit 100 and the vehicle body unit 200. In the case where the chassis unit 100 is provided with an apparatus that carries out the operations of coupling and decoupling the chassis unit 100 and the vehicle body unit 200, the coupling control part F1.40 controls this apparatus to carry out the operations of coupling and decoupling the chassis unit 100 and the vehicle body unit 200.

(Functional Configuration of Server Apparatus)

The functional configuration of the server apparatus 300 will be described next with reference to FIG. 6. As illustrated in FIG. 6, the server apparatus 300 in the system according to this embodiment includes, as functional components, a request fulfilment part F310, a selection part F320, a command creation part F330, and a chassis unit management database D310. The server apparatus 300 implements the request fulfilment part F310, the selection part F320, and the command creation part F330 by executing programs stored in the main storage unit 302 or the auxiliary storage unit 303 by the processor 301. One or some of the request fulfilment part F310, the selection part F320, and the command creation part F330 may be implemented entirely or partly by a hardware circuit(s). One or some of the request fulfilment part F310, the selection part F320, and the command creation part F330 or a part of the processing of them may be implemented by another computer(s) connected to the network N1. For example, the processing executed as the request fulfilment part F310, the processing executed as the selection part F320, and the processing executed as the command creation part F330 may be executed by different computers.

The chassis unit management database D310 is created by a database management system program (DBMS program) executed by the processor 301. Specifically, the chassis unit management database D310 is created by managing data stored in the auxiliary storage unit 303 by the DBMS program. The chassis unit management database D310 is, for example, a relational database.

What is stored in the chassis unit management database D310 is information about the chassis units 100 that are under the management of the server apparatus 300. The chassis unit management database D310 stores information about each chassis unit 100 and information identifying that chassis unit 100 linked therewith. An exemplary structure of the information stored in the chassis unit management database D310 will be described with reference to FIG. 7. FIG. 7 illustrates an exemplary table structure of the chassis unit management database D310. The structure of the table stored in the chassis unit management database D310 (which will be also referred to as "chassis unit information table" hereinafter) is not limited to that illustrated in FIG. 8, but some fields may be added, changed, or removed fitly.

The chassis unit information table in FIG. 7 has the fields of chassis ID, present location, and status. What is stored in the chassis ID field is information identifying each chassis unit 100 (chassis ID). What is stored in the present location field is information indicating the present location of each chassis unit 100. The information stored in the present location field may be information indicating the address of the place where each chassis unit 100 is located or information indicating the coordinates on a map (or longitude and latitude) of the place where the chassis unit 100 is located. What is stored in the status field is information indicating the status of each chassis unit 100. For example, when a chassis unit 100 is in the state coupled with a vehicle body unit 200, the information "coupled" is stored in the status field. When the chassis unit 100 is performing the operation of retrieving a target vehicle body unit 200, the information "retrieving" is stored in the status field. When the chassis unit 100 is not coupled with a vehicle body unit nor performing the operation of retrieving a target vehicle body unit 200, the information "free" is stored in the status field.

The request fulfilment part F310 executes the processing of accepting a request for retrieval sent from a user's terminal 400. The request fulfilment part F310 accepts a request for retrieval by receiving the request for retrieval sent from the user's terminal 400 to the server apparatus 300 through the communication unit 304. The request for retrieval contains information indicating the location of the place (specific place) where the target vehicle body unit 200 is laid, information indicating the location of the destination of transportation of the target vehicle body unit 200, and a designation of the desired time of retrieval. The information indicating the location of the specific place and the information indicating the location of the destination of transportation may be either information indicating the addresses of the specific place and the destination of transportation or information indicating the coordinates on a map of the specific place and the destination of transportation. The information indicating the location of the specific place, the information indicating the location of the destination of transportation of the target vehicle body unit 200, and the desired time of retrieval are passed from the request fulfilment part F310 to the selection part F320.

The selection part F320 executes the processing of selecting a chassis unit for retrieval 100 from among the chassis units 100 that are under the management of the server apparatus 300. In this embodiment, the selection part F320 firstly accesses the chassis unit management database D310 to pick the chassis units 100 for which the information "free" is stored in the status field of the chassis unit information table. Then, the selection part F320 selects a chassis unit for retrieval 100 from among the chassis units 100 picked as above. For example, as illustrated in FIG. 8, the selection part F320 selects as the chassis unit for retrieval 100 a chassis unit 100 whose present location falls within a specific range from among the chassis units 100 in the free state. The specific range is such a range that the chassis units 100 located in it are expected to be able to go to the specific place by the desired time of retrieval. The specific range as such is determined based on, for example, traffic information (e.g. traffic jam forecast and information about road repairs) in the area around the specific place around the desired time of retrieval. In the case where there are a plurality of chassis units 100 in the specific range, the chassis unit 100 located closest to the specific place among them may be selected as the chassis unit for retrieval 100. The chassis ID of the chassis unit for retrieval 100 is passed from the selection part F320 to the command creation part F330.

The command creation part F330 is configured to create a command to retrieve the target vehicle body unit 200 from the specific place (i.e. retrieval command). The retrieval command includes, for example, the following first to third commands:

first command: a command to cause the chassis unit for retrieval 100 to travel in such a way as to arrive at the specific place by the desired time of retrieval second command: a command to couple the chassis unit for retrieval 100 to the target vehicle body unit 200 at the specific place third command: a command to cause the chassis unit for retrieval 100 to travel from the specific place to the destination of transportation.

The retrieval command created by the command creation part F330 is sent through the communication unit 304 to the chassis unit (chassis unit for retrieval) associated with the chassis ID passed from the selection part F320.

(Process Performed by Server Apparatus)

A process performed by the server apparatus 300 in the system according to the embodiment will be described with reference to FIG. 9. FIG. 9 is a flow chart of the process performed by the server apparatus 300 when it receives a request for retrieval sent from a user's terminal 400 used by the user of the target vehicle body unit 200.

Referring to FIG. 9, when the communication unit 304 of the server apparatus 300 receives a request for retrieval from a user's terminal 400, the request fulfilment part F310 accepts the request for retrieval (step S101). The request fulfilment part F310 extracts information indicating the location of the specific place, information indicating the location of the destination of transportation of the target vehicle body unit 200, and information indicating the desired time of retrieval from the request for retrieval and passes them to the selection part F320.

The selection part F320 selects a chassis unit for retrieval 100 on the basis of the information passed from the request fulfilment part F310 (step S102). Specifically, the selection part F320 firstly determines a specific range on the basis of the information indicating the location of the specific place and the desired time of retrieval. As described above, the specific range is such a range that the chassis units 100 located in it are expected to be able to go to the specific place by the desired time of retrieval. The specific range as such is determined based on, for example, traffic information in the area around the specific place around the desired time of retrieval. Then, the selection part F320 accesses the chassis unit management database D310 to pick the chassis units 100 for which the information "free" is stored in the status field of the chassis unit information table. Then, the selection part F320 selects as the chassis unit for retrieval 100 a chassis unit 100 whose present location indicated by the information stored in the present location field of the chassis unit information table falls within the specific range from among the chassis units 100 picked as above. The selection part F320 passes the chassis ID of the chassis unit for retrieval 100 thus selected to the command creation part F330.

The command creation part F330 creates a retrieval command (step S103). The retrieval command includes the first to third commands mentioned above. The retrieval command created by the command creation part F330 is sent to the chassis unit for retrieval 100 through the communication unit 304 (step S104).

When the chassis unit for retrieval 100 receives the retrieval command, the operation plan creation part F110 thereof creates an operation plan based on the retrieval command. As described above, the operation plan includes data that specifies a planned travel route of the chassis unit for retrieval 100 by a set of road links and data that specifies an operation to be performed at a certain point in the planned travel route by the chassis unit for retrieval 100. The operation plan in this embodiment includes data that specifies a planned travel route from the present location to the destination of transportation via the specific place and data that specifies the operation to be performed by the chassis unit for retrieval 100 at the specific place. The operation to be performed by the chassis unit for retrieval 100 at the specific place is the operation of coupling the chassis unit for retrieval 100 to the target vehicle body unit 200. After the operation plan is created as above, the travel control part F130 of the chassis unit for retrieval 100 starts to cause the chassis unit for retrieval 100 to travel. Specifically, the travel control part F130 controls the travel of the chassis unit for retrieval 100 by controlling the drive unit. 106 thereof on the basis of the planned travel route mentioned above, environment data generated by the environment perceiving part F120, and location information acquired by the location information acquisition unit 105. This enables the chassis unit for retrieval 100 to travel autonomously from its present location to the specific place by autonomous driving. After the chassis unit for retrieval 100 arrives at the specific place, the coupling control part F140 thereof controls an external apparatus or an apparatus provided on the chassis unit 100 as mentioned above to couple the chassis unit for retrieval 100 to the target vehicle body unit 200. After the completion of the operation of coupling the chassis unit for retrieval 100 to the target vehicle body unit 200, the travel control part F130 restarts to cause the chassis unit for retrieval 100 to travel. Specifically, the travel control part F130 controls the travel of the chassis unit for retrieval 100 by controlling the drive unit 106 on the basis of the planned travel route, environment data generated by the environment perceiving part F120, and location information acquired by the location information acquisition unit 105. This enables the chassis unit for retrieval 100 to travel autonomously from the specific place to the destination of transportation by autonomous driving. Thus, the target vehicle body unit 200 retrieved from the specific place can be transported to the destination designated by the user.

As above, when the need for retrieving a vehicle body unit laid at a specific place arises, the vehicle management system can retrieve the vehicle body unit using a chassis unit located near the specific place by the process according to the flow chart of FIG. 9. This can save the user of the vehicle body unit the time and effort of doing the operation of retrieval for himself/herself. In consequence, it is possible to retrieve a vehicle body unit laid at a specific place efficiently.

<Modification>

There may be cases where the chassis unit selected as the chassis unit for retrieval is owned by the user of the chassis unit for retrieval. In such cases, using the chassis unit selected as the chassis unit for retrieval without user's permission can be inconvenient for the user.

To address the above problem, the system according to this modification is configured to ask the user of the chassis unit selected as the chassis unit for retrieval for permission of the use of the chassis unit. Then, the selected chassis unit is used for the retrieval operation only when the user gives permission to do so.

After selecting a chassis unit for retrieval 100, the selection part F320 in the system of this modification sends a use request signal to a terminal used by the user of the chassis unit for retrieval 100. The use request signal contains information asking for permission of the use of the chassis unit for retrieval 100 and information about an incentive that will be given to the user if the chassis unit for retrieval 100 is used. The incentive includes, for example, a fee for the electricity cost (namely, the cost for recharging the battery with electricity by the amount consumed by the retrieval operation) and a reward. The electricity cost can be calculated based on the distance from the present location of the chassis unit for retrieval 100 to the specific place and the distance from the specific place to the destination of transportation. The reward may be a predetermined fixed value or a variable value varied in accordance with the time through which the chassis unit for retrieval 100 is used. Presenting such an incentive to the user of the chassis unit for retrieval 100 can motivate the user to permit the use of the chassis unit for retrieval 100. In the case where the motor of the chassis unit for retrieval 100 includes an internal combustion engine, the incentive may include a fee for the fuel cost (namely, the cost for the fuel consumed by the retrieval operation) instead of the fee for the electricity cost.

If a signal responding to the use request signal is a signal indicating permission of the use of the chassis unit for retrieval 100, the selection part F320 passes the chassis ID of the chassis unit for retrieval 100 selected as above to the command creation part F330. On the other hand, if a signal responding to the use request signal is a signal indicating disapproval of the use of the chassis unit for retrieval 100, the selection part F320 selects another chassis unit for retrieval 100 again. Specifically, the selection part F320 selects another chassis unit for retrieval 100 from among the chassis units 100 with the exception of the chassis unit 100 of which the use was disapproved of. For example, the selection part F320 may select anew, as the chassis unit for retrieval 100, the chassis unit 100 closest to the specific place among the chassis units 100 in the free state with the exception of the chassis unit 100 of which the use was disapproved of. Then, the selection unit F320 may send a use request signal to a terminal used by the user of the newly selected chassis unit for retrieval 100.

(Process Performed by Server Apparatus)

A process performed by the server apparatus 300 in the system according to the modification will be described with reference to FIG. 10. FIG. 10 is a flow chart of the process performed by the server apparatus 300 when it receives a request for retrieval sent from a user's terminal 400 used by the user of a target vehicle body unit 200. The steps of processing same as those in the flow chart of FIG. 9 are denoted by the same reference signs.

In the process according to the flow chart of FIG. 10, after selecting a chassis unit for retrieval 100 (in step S102), the selection part F320 executes the processing of steps S1021 to S1023 before executing the processing of step S103.

In step S1021, the selectin part F320 generates a use request signal. The use request signal contains information asking for permission of the use of the chassis unit for retrieval 100 and information about an incentive that will be given to the user if the chassis unit for retrieval 100 is used, as described above. The use request signal generated by the selection part F320 is sent to a terminal used by the user of the chassis unit for retrieval 100 selected in step 102 through the communication unit 304 (step S1022).

When the server apparatus 300 receives a signal responding to the use request signal sent from the aforementioned terminal, the selection part F320 determines whether or not the response signal is a signal indicating permission of the use of the chassis unit for retrieval 100 (step S1023). If the response signal is a signal indicating disapproval of the use of the chassis unit for retrieval 100 (a negative answer in step S1023), the selectin part F320 returns to the processing of step S102 to select another chassis unit for retrieval 100 anew. On the other hand, if the response signal is a signal indicating permission of the use of the chassis unit for retrieval 100 (an affirmative answer in step S1023), the selection part F230 passes the chassis ID of chassis unit for retrieval selected in step S102 to the command creation part F330. Then, the command creation part F330 executes the processing of steps S103 and S104 subsequently.

When the need for retrieving a vehicle body unit laid at a specific place arises, the process according to the flow chart of FIG. 9 can retrieve the vehicle body unit efficiently without causing inconvenience to the user of the chassis unit.

<Others>

The above embodiment and modification have been described only by way of example. Changes can be made to the above embodiment and modification without departing from the essence of the present disclosure. For examples, features of the above embodiment and modification may be employed in any possible combination.

The processing and means that have been described in this disclosure may be employed in any combination so long as it is technically feasible to do so. One, some, or all of the processes that have been described as processes performed by a single apparatus may be performed by a plurality of apparatuses in a distributed manner. One, some, or all of the processes that have been described as processes performed by a plurality of apparatuses may be performed by a single apparatus. The hardware configuration employed to implement various functions in a computer system may be modified flexibly.

The technology according to this disclosure can be carried out by supplying a computer program(s) (or information processing program(s)) that implements the functions described in the above description of the embodiment to a computer to let one or more processors of the computer read and execute the program(s). Such a computer program(s)

may be supplied to the computer by a computer-readable, non-transitory storage medium that can be connected to a system bus of the computer or through a network. The computer-readable, non-transitory storage medium refers to a recording medium that can store information, such as data and programs, electrically, magnetically, optically, mechanically, or chemically in such a way as to allow the computer or the like to read the stored information. Examples of such a recording medium include any type of disc medium including a magnetic disc, such as a floppy disc (registered trademark) and a hard disk drive (HDD), and an optical disc, such as a CD-ROM, a DVD, and a Blu-ray disc. Further examples of the recording medium include a read-only memory (ROM), a random access memory (RAM), an EPROM, an EEPROM, a magnetic card, a flash memory, an optical card, and a solid state drive (SSD).

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus for managing a separable vehicle including a vehicle body unit and a chassis unit adapted to be coupled to and decoupled from the vehicle body unit and capable of travelling autonomously, comprising a controller equipped with at least one processor,
   the controller configured to execute processing of:
   accepting a request for retrieving a target vehicle body unit that is laid at a specific place;
   selecting a chassis unit for retrieval from among chassis units in a state separated from any vehicle body unit, the chassis unit for retrieval being a chassis unit to be used to retrieve the target vehicle body unit; and
   sending a retrieval command to the chassis unit for retrieval, the retrieval command being a command to retrieve the target vehicle body unit.

2. The information processing apparatus according to claim 1, wherein after selecting the chassis unit for retrieval, the controller further executes processing of:
   sending a use request requesting permission of a use of the chassis unit for retrieval to a terminal used by a user of the chassis unit for retrieval; and
   when receiving a signal indicating permission of the use of the chassis unit for retrieval from the terminal, sending the retrieval command to the chassis unit for retrieval.

3. The information processing apparatus according to claim 2, wherein the use request contains information about an incentive that will be given to the user if the user permits the use of the chassis unit for retrieval.

4. The information processing apparatus according to claim 2, wherein if receiving a signal indicating disapproval of the use of the chassis unit for retrieval from the terminal, the controller selects a chassis unit other than the chassis unit for retrieval from among the chassis units in the state separated from any vehicle body unit as a new chassis unit for retrieval.

5. The information processing apparatus according to claim 1, wherein the request for retrieval contains information indicating a location of the specific place, information indicating a destination of transportation to which the target vehicle body unit is to be transported, and information indicating a desired time of retrieval at which the target vehicle body unit is to be retrieved from the specific place.

6. The information processing apparatus according to claim 5, wherein the retrieval command includes:
   a command to cause the chassis unit for retrieval to travel in such a way as to arrive at the specific place by the desired time of retrieval;
   a command to couple the chassis unit for retrieval to the target vehicle body unit at the specific place; and
   a command to cause the chassis unit for retrieval to travel from the specific place to the destination of transportation.

7. The information processing apparatus according to claim 6, wherein the controller selects a chassis unit located within a specific range from the specific place from among the chassis units in the state separated from any vehicle body unit as the chassis unit for retrieval.

8. A non-transitory storage medium storing an information processing program for managing a separable vehicle including a vehicle body unit and a chassis unit adapted to be coupled to and decoupled from the vehicle body unit and capable of travelling autonomously,
   the information processing program configured to cause a computer to execute steps of:
   accepting a request for retrieving a target vehicle body unit that is laid at a specific place;
   selecting a chassis unit for retrieval from among chassis units in a state separated from any vehicle body unit, the chassis unit for retrieval being a chassis unit to be used to retrieve the target vehicle body unit; and
   sending a retrieval command to the chassis unit for retrieval, the retrieval command being a command to retrieve the target vehicle body unit.

9. The non-transitory storage medium according to claim 8, wherein after the chassis unit for retrieval is selected, the information processing program causes the computer to further execute steps of:
   sending a use request requesting permission of a use of the chassis unit for retrieval to a terminal used by a user of the chassis unit for retrieval; and
   when receiving a signal indicating permission of the use of the chassis unit for retrieval from the terminal, sending the retrieval command to the chassis unit for retrieval.

10. The non-transitory storage medium according to claim 9, wherein the use request contains information about an incentive that will be given to the user if the user permits the use of the chassis unit for retrieval.

11. The non-transitory storage medium according to claim 9, wherein if a signal indicating disapproval of the use of the chassis unit for retrieval is received from the terminal, the information processing program causes the computer to execute the step of selecting a chassis unit other than the chassis unit for retrieval from among the chassis units in the state separated from any vehicle body unit as a new chassis unit for retrieval.

12. The non-transitory storage medium according to claim 8, wherein the request for retrieval contains information indicating a location of the specific place, information indicating a destination of transportation to which the target vehicle body unit is to be transported, and information indicating a desired time of retrieval at which the target vehicle body unit is to be retrieved from the specific place.

13. The non-transitory storage medium according to claim 12, wherein the retrieval command includes:
   a command to cause the chassis unit for retrieval to travel in such a way as to arrive at the specific place by the desired time of retrieval;

a command to couple the chassis unit for retrieval to the target vehicle body unit at the specific place; and a command to cause the chassis unit for retrieval to travel from the specific place to the destination of transportation.

14. The non-transitory storage medium according to claim 13, wherein in the step of selecting the chassis unit for retrieval, a chassis unit located within a specific range from the specific place is selected as the chassis unit for retrieval from among the chassis units in the state separated from any vehicle body unit.

15. An information processing method for managing a separable vehicle including a vehicle body unit and a chassis unit adapted to be coupled to and decoupled from the vehicle body unit and capable of travelling autonomously, executed by a computer, comprising:

accepting a request for retrieving a target vehicle body unit that is laid at a specific place;

selecting a chassis unit for retrieval from among chassis units in a state separated from any vehicle body unit, the chassis unit for retrieval being a chassis unit to be used to retrieve the target vehicle body unit; and sending a retrieval command to the chassis unit for retrieval, the retrieval command being a command to retrieve the target vehicle body unit.

16. The information processing method according to claim 15, wherein after selecting the chassis unit for retrieval, the computer further executes steps of:

sending a use request requesting permission of a use of the chassis unit for retrieval to a terminal used by a user of the chassis unit for retrieval; and when receiving a signal indicating permission of the use of the chassis unit for retrieval from the terminal, sending the retrieval command to the chassis unit for retrieval.

17. The information processing method according to claim 16, wherein the use request contains information about an incentive that will be given to the user if the user permits the use of the chassis unit for retrieval.

18. The information processing method according to claim 16, wherein if receiving a signal indicating disapproval of the use of the chassis unit for retrieval from the terminal, the computer executes the step of selecting a chassis unit other than the chassis unit for retrieval from among the chassis units in the state separated from any vehicle body unit as a new chassis unit for retrieval.

19. The information processing method according to claim 15, wherein the request for retrieval contains information indicating a location of the specific place, information indicating a destination of transportation to which the target vehicle body unit is to be transported, and information indicating a desired time of retrieval at which the target vehicle body unit is to be retrieved from the specific place.

20. The information processing method according to claim 19, wherein the retrieval command includes:

a command to cause the chassis unit for retrieval to travel in such a way as to arrive at the specific place by the desired time of retrieval;

a command to couple the chassis unit for retrieval to the target vehicle body unit at the specific place; and a command to cause the chassis unit for retrieval to travel from the specific place to the destination of transportation.

* * * * *